United States Patent Office 2,944,988
Patented July 12, 1960

---

2,944,988
PROCESS FOR PRODUCTION OF AN IRON CATALYST

Erwin Richard Sauter, Angus Farquhar McDonald, and John Andrew Charlesworth, all of Sasolburg, Orange Free State, Union of South Africa, assignors to South African Coal, Oil and Gas Corporation Limited, Sasolburg, Union of South Africa No Drawing. Filed Oct. 5, 1956, Ser. No. 614,064
Claims priority, application Union of South Africa Oct. 11, 1955

3 Claims. (Cl. 252—443)

The present invention relates to an improved process for the production of iron catalysts, more especially for the synthesis of hydrocarbons and/or oxygenates from carbon monoxide and hydrogen, to the catalysts thus produced, and to processes carried out with such catalysts.

More particularly the invention relates to an improved method of providing such catalysts with promoters, activators, other admixtures selectively influencing the reaction or the catalyst behaviour or the like starting from catalyst base materials having a high specific gravity, such as natural magnetite and the like.

It has already been proposed in the production of catalysts, in particular for reactions of the Fischer-Tropsch type, to impregnate an oxidic compound of iron e.g., magnetite with alkali, e.g. a solution of potassium carbonate or potassium hydroxide, and then to reduce the material thus obtained with hydrogen or a gas containing hydrogen.

It has also been proposed in the production of so-called fused catalysts to add the alkali metal compound and/or alumina and the like to the mixture to be fused or undergoing fusion and then to reduce the fused material, preferably after comminution.

Disadvantages of the above two types of catalysts are the following:

The impregnation of the dense magnetite or the like with alkali does not permit of obtaining a uniform distribution in the catalyst surface strata after reduction of the catalyst. In such impregnated catalysts, the promoter or the like is usually rather loosely bound, so that it is not very suitable for fluidised bed or streaming catalyst techniques, due to the abrasion or attrition usually occurring.

Although according to the second method, good catalysts are obtained, e.g. for ammonia synthesis or hydrocarbon synthesis, this method of catalyst production is comparatively expensive. The crushed magnetite is fused in electric furnaces together with the additives which requires a great deal of electric energy. It is considered essential to preserve a magnetite structure after fusion. However, it often happens that the carbon electrodes used in this process reduce the ore and thus cause a substantial increase of the proportion of FeO in the fused mass as compared with the original composition of the magnetite. Catalysts thus produced usually prove to be inferior in quality. Another disadvantage of this fusion process is, that in the case of an addition of potassium carbonate to the melt, a considerable proportion thereof vaporises and although no great difficulty is encountered in adjusting the proper alkali content in the catalyst, these vapours lead to a loss of alkali apart from sometimes causing a nuisance in the catalyst production plant.

Another important disadvantage of such catalysts is that although after fusion, e.g. the potassium carbonate is well distributed in the molten ore, after reduction of the catalyst, it separates out from the iron and most of it can then be washed out.

It is an object of the invention to produce a catalyst from a preferably dense base material in which the alkali or other promoter, activator, or admixture selectively influencing the reaction of the catalyst behaviour is distributed uniformly on and in the active catalyst surface and is well retained therein, and, although oxide fusion is avoided, has a high or improved activity as compared with similar good catalysts produced by methods hitherto known. Numerous previous attempts to achieve this have been unsuccessful.

In accordance with the invention, catalysts are produced by partially reducing a reducible preferably dense oxidic compound of iron to a porous or spongy structure, impregnating the reduced product with the requisite proportion of an alkali metal compound and/or other promoter, activator, or other admixture selectively influencing the reaction or the catalyst behaviour, and then subjecting the catalyst material to a further heat treatment involving a moderate or more pronounced sintering better to lock the admixture in the mass, while not necessarily fritting the catalyst particles together, and simultaneously or subsequently reducing the catalyst to a greater extent than attained in the first stage of reduction.

Examples of oxidic compounds of iron to be processed in accordance with the invention are dense oxidic iron ores, e.g. magnetite, such as Allenwood (United States of America) ore or iron ore from the Ermelo district (Union of South Africa), and hematite ores. Other dense forms of $Fe_3O_4$, $Fe_2O_3$, $Fe(OH)_3$, $FeCO_3$ may be employed. The reduction in the first stage of the reaction is generally terminated when the material contains 30–58% of free iron, preferably 30–50%.

The partial reduction is preferably carried out with suitable reducing gases containing or generating hydrogen, e.g. substantially pure hydrogen, hydrogen containing carbon monoxide and/or other admixtures, or with carbon-monoxide alone, or with ammonia synthesis gas, nitriding of the catalyst generally taking place simultaneously in the latter case. Other suitable gasiform reducing agents may also be employed. In the first stage, the said reductions are generally carried out at temperatures of 200 to 500° C., preferably at about 300° C.–400° C., or up to 450° C. The said reduction may be accelerated by the application of increased pressures, say of the order of 20 atmospheres. It generally takes depending on circumstances 24–48 hours, say 36 hours.

Substances facilitating the further reduction such as suitable salts of copper may be incorporated into the material for the production of the catalyst, preferably prior to the second reduction.

It is advantageous to provide an initial material having the particle size distribution in which it is to be subsequently employed in the reaction, or to bring it into this state prior to the partial reduction. Thus, for a fixed bed catalyst, it may be desirable to comminute the material to a particle size of e.g. 12 to 30 mesh. This material is advantageously in the form of irregularly shaped particles. For subsequent fluidised operation or streaming circulation of catalysts, the material is advantageously brought to a particle size distribution usual in such processes, e.g. mainly 200–400 mesh. Catalysts for use in the slurry phase may also be produced in accordance with the invention.

The partial reduction treatment may be carried out in any suitable manner, for instance, in fixed beds, e.g. on superimposed trays placed in a tower, or in a tower filled with the catalyst material, or the reduction may be carried out in the fluidised state, or with the material carried on a moving support or in a rotary reactor or the like.

The temperature is preferably maintained by preheating the reduction gas and it is advantageous to insulate the reduction vessels against loss of heat. In some cases, the reduction may be carried out in the reactor in which the catalyst is subsequently to be employed, but in general, a special reducing vessel will be more practicable. The first reduction is terminated when a sufficiently porous structure has been obtained, which may vary according to the catalyst properties desired in the reaction in which it is to be employed. Often maximum porosity will be aimed at.

The impregnation with solutions, usually aqueous solutions of the promoters, activators or other admixtures selectively influencing the reaction in accordance with the present invention may be carried out in any suitable manner, e.g. by dumping the partially reduced material into a solution of suitable concentration or by spraying the solution on to or trickling it over the material to be impregnated. The application of vacuum to the catalyst prior to impregnation may prove useful. Solutions of alkali metal compounds, e.g. aqueous or alcoholic solutions of compounds having an alkaline reaction, e.g. potassium carbonate, or potassium hydroxide, for which in some cases, potassium silicate may be substituted at least in part, may be employed. Other means of incorporating silica where required may also be employed. If sufficient alumina is not already present in the initial materials, this may also be added at this stage. e.g. in the form of potassium aluminate, aluminium nitrate or the like in any desired proportion. Certain detergents or wetting agents often prove to be useful aids to obtaining thorough impregnation with the above-mentioned or similar impregnation liquids.

The material is then dried and is thereupon subjected to a more extensive reduction to the degree required for the final catalyst, say to produce a product containing 60–75% free iron, and sintering, recrystallization or other structural modifications to lock the alkali or other promoter or the like more completely into the structure of the catalyst thus bringing the catalyst to the desired activity. The temperature for the further reduction and/or sintering or the like is usually at between about 300 and 600° C., preferably round about 400° C., and depends on the composition of the catalyst base. The degree of sintering or the like depends largely on the duration of the heat treatment. This may be e.g. from 24–48 hours, say about 36 hours.

Preferably the catalyst is finally reduced either substantially, completely or to the degree desired. Preferably, the sintering or like treatment is carried out simultaneously with the reduction.

If the catalyst, after these treatments, does not have the correct particle size distribution, it is subjected to a suitable classification, comminution or other size adjustment treatment in an inert atmosphere.

The process in accordance with the present invention may also be employed for the regeneration or reconditioning of spent catalyst, usually after their having been subjected to oxidative regeneration.

Some other examples of reactions for which catalysts in accordance with the present invention may be employed are the synthesis of hydrocarbons and/or oxygenates from carbon monoxide and hydrogen if desired together with carbon dioxide, carbon monoxide and water, methanisation, oxo-synthesis, liquid phase Fischer-Tropsch synthesis, ammonia synthesis, hydrogenations, dehydrogenations, isomerisations, reforming or cyclisation.

By modification of the quantity, type and combination of the promoter, activator and/or other admixture, the selectivity of the catalyst as regards the products produced can be modified, e.g. in respect of the carbon structure, such as more or less cyclisation or isomerisation, a smaller or greater proportion of oxygenates, more or less methane or paraffin wax or the like.

The invention will be further described and ascertained with reference to the following examples, but the invention is not limited to the examples given.

*Example 1*

200 grams of a fraction of 12/20 mesh Allenwood magnetite ore, having a bulk density of 3.8, were placed into a reduction furnace and hydrogen was passed over it. The temperature was raised to 400° C. When this temperature had been reached, the hydrogen flow was adjusted to about 40 litres per hour and the reduction was continued for 36 hours. After 24 hours, a small sample carefully removed under an inert atmosphere, on analysis showed: 29% Fe, 14% FeO, 40% $Fe_2O_3$. After 36 hours' reduction, the content of free iron rose to 40%. After cooling the crude catalyst was removed under nitrogen. The catalyst was then dumped into a solution of potassium hydroxide in methanol diluted with water and containing 3.5 grams of potassium hydroxide per 100 millilitres of methanol.

50 millilitres of the said solution were used for 120 grams of catalyst material. After ½ hour, the excess solution was drained off and the catalyst material dried in a nitrogen atmosphere. It then contained 0.39 gram of potassium hydroxide per 100 grams of iron calculated as metal. This intermediate product was now placed back into the reduction furnace and was further reduced at 430° C. for 36 hours and with 40 litres of hydrogen per hour per 100 grams of catalyst material. After this treatment about 65% of free iron was present in the catalyst and the bulk density was near 3.8 again. The catalyst was not as black as the intermediate product but had a slight greyish appearance.

170 grams of the catalyst were placed into a laboratory scale synthesis reactor.

The reactor was brought up to 480° F. with a slow flow of hydrogen. When the temperature was attained, synthesis gas ($H_2$:CO=2.7:1) was passed in initially at a pressure of 25 pounds per square inch. After a day or so, the temperature was gradually raised to about 300° C. and after a further period of conditioning the pressure was then gradually brought up to the reaction pressure of 250 pounds per square inch.

The reaction was run at the said pressure in three separate periods of 24 hours each as follows:

| | ° F. |
|---|---|
| Period 1 | 500 |
| Period 2 | 540 |
| Period 3 | 580 |

The results obtained are set out in the following tables.

| Operating Period | 1 | 2 | 3 |
|---|---|---|---|
| Volume Catalyst in millilitres | 50 | 50 | 50 |
| Feed Gas Nm3 | 0.702 | 0.810 | 0.985 |
| Tail Gas Nm3 | 0.4747 | 0.4855 | 0.4839 |
| Fresh Feed Load Nm³/hr | 0.0292 | 0.0333 | 0.0410 |
| Fresh Feed Load Nm³/hr./m³ cat | 584 | 676 | 820 |
| Volume contraction based on gas | 32.4% | 40.2% | 50.8% |
| Volume contraction based on $N_2$ | 27.4% | 36.7% | 49.4% |

Percentage composition by volume.

| | 1 | | | | 2 | | | | 3 | | | |
|---|---|---|---|---|---|---|---|---|---|---|---|---|
| | Feed Gas | Tail Gas | $N_2$ Corrected | Difference | Feed Gas | Tail Gas | $N_2$ Corrected | Difference | Feed Gas | Tail Gas | $N_2$ Corrected | Difference |
| $N_2$ | 4.5 | 6.2 | 4.5 | | 4.5 | 7.1 | 4.5 | | 4.5 | 8.9 | 4.5 | |
| $CO_2$ | 32.0 | 12.0 | 8.7 | 23.3 | 32.0 | 4.9 | 3.1 | 28.9 | 32.0 | 3.3 | 1.7 | 30.3 |
| $H_2$ | 62.3 | 63.6 | 46.1 | 16.2 | 62.3 | 61.6 | 39.0 | 23.3 | 62.4 | 60.5 | 30.6 | 31.8 |
| CO | 0.0 | 13.3 | 9.6 | 9.6 | 0.0 | 18.5 | 11.7 | 11.7 | 0.0 | 18.0 | 9.1 | 9.1 |
| $CH_4$ | 1.2 | 2.6 | 1.9 | 0.7 | 1.2 | 3.4 | 2.2 | 1.0 | 1.1 | 4.5 | 2.3 | 1.2 |

| Period | 1 | 2 | 3 |
|---|---|---|---|
| Ratio $CO:H_2$ offered | 1:1.95 | 1:1.95 | 1:1.95 |
| Ratio $CO:H_2$ consumed | 1:0.70 | 1:0.81 | 1:1.05 |
| Ideal gas content in per cent | 54.3 | 57.8 | 65.6 |
| % Total $H_2$ conversion | 26.0 | 37.4 | 51.0 |
| % Total CO conversion | 72.8 | 90.4 | 94.8 |
| % Total $(CO+H_2)$ conversion | 41.8 | 55.4 | 65.9 |
| % consumed CO converted to CH | 58.3 | 59.4 | 70.0 |
| % consumed CO converted to $CH_4$ | 3.0 | 3.5 | 4.0 |
| % $CH_4$ in product volume basis | 5.1 | 5.8 | 5.7 |
| Actual yield gms./Nm3 feed gas | 81.1 | 106.8 | 104.1 |

Products:

|  | Period 1 | | Period 2 | | Period 3 | |
|---|---|---|---|---|---|---|
|  | $H_2O$ | CH | $H_2O$ | CH | $H_2O$ | CH |
| Hot catch pot | 27.8 | 19.7 | 49.0 | 32.3 | 81.2 | 32.6 |
| Cold catch pot | 0.0 | 0.7 | 0.0 | 0.7 | 0.0 | 3.4 |
| Low temperature trap | | 8.5 | | 16.4 | | 19.4 |
| $CH_4$ | | 3.5 | | 5.8 | | 8.4 |
| $C_2H_6$ | | 3.8 | | 7.2 | | 7.8 |
| Unsats | | 22.2 | | 24.2 | | 31.0 |
| Total | 27.8 | 58.4 | 49.0 | 86.8 | 81.2 | 102.6 |

It can be seen from the above that the catalyst has all the properties of significance for a good catalyst for hydrocarbon synthesis in fluidised or streaming catalyst systems.

With similar operation and using starting material on the lesser density side it is not difficult to produce catalysts to be used in fixed bed operation or in the slurry phase.

*Example 2*

A similar intermediate product as in Example 1 was used for impregnation with 3 grams of potassium hydroxide in 50 millilitres of methanol of 70 percent strength and containing also 2 grams of copper nitrate. After careful drying and reduction in the furnace with hydrogen at 400° C. under the previous conditions, it was observed that the reduction time was shortened by about ⅓ to attain 65% free iron in the catalyst. This was apparently due to the copper contained in the material. As in this particular case the catalyst surface has a different character, this type of catalyst when employed in hydrocarbon synthesis has a different selectivity e.g. in the sense of increasing the formation of hydrocarbon or oxygenated products.

*Example 3*

The same intermediate product was used and first impregnated with a 0.1% aqueous solution of potassium silicate. After drying a second impregnation was effected with a 0.1% aqueous solution of aluminium nitrate. Then the catalyst was dried, washed with distilled water, dried again and subjected to further reduction.

The above examples show that there is a wide range of possibilities for such impregnations, and in connection with this also a wide range for influencing the course of the synthesis itself as regard the products obtained.

What we claim is:

1. A process for the production of an iron catalyst suitable for the synthesis of hydrocarbons from a synthesis gas containing carbon monoxide and hydrogen, which comprises partially reducing magnetite to an iron material containing 30–50% of free iron and being of porous structure, impregnating the partially reduced product with catalyst promoting proportions of potassium carbonate, subjecting the impregnated material to a non-oxidising heat treatment involving sintering to at least reduce the porosity while not fritting the particles of the material together and reducing the material further to an iron content of 60–75%.

2. A process for the production of a catalyst suitable for the synthesis of hydrocarbons from a synthesis gas containing carbon monoxide and hydrogen, which comprises partially reducing magnetite at a temperature of 300°–450° C. with a gas containing hydrogen and terminating the reaction when the material is in a spongy condition and contains 30–50% of free iron, impregnating the material with a solution of potassium carbonate, drying the impregnated material and subjecting it to further reduction with a gas containing hydrogen at a temperature between 400° and 600° C. and for a sufficient time to sinter the material and lock the promoter more firmly in its structure.

3. A process for the production of an iron catalyst suitable for the synthesis of hydrocarbons from a synthesis gas containing carbon monoxide and hydrogen, which comprises partially reducing a magnetite to an iron material containing 30–50% of free iron and being of porous structure, impregnating the partially reduced product with catalyst promoting proportions of potassium carbonate and with a copper salt, subjecting the impregnated material to a non-oxidizing heat treatment involving sintering to at least reduce the porosity while not fritting the particles of the material together and reducing the material further to a greater extent than in the aforesaid reduction.

References Cited in the file of this patent

UNITED STATES PATENTS

| 1,148,570 | Bosch et al. | Aug. 3, 1915 |
| 2,476,920 | Segura | July 19, 1949 |
| 2,496,343 | Gillepsie | Feb. 7, 1950 |
| 2,541,671 | Segura et al. | Feb. 13, 1951 |
| 2,567,296 | Milligan et al. | Sept. 11, 1951 |
| 2,797,200 | Barber | June 25, 1957 |